(12) United States Patent
Lenkens et al.

(10) Patent No.: US 7,878,580 B2
(45) Date of Patent: Feb. 1, 2011

(54) ROOF ASSEMBLY FOR A VEHICLE

(75) Inventors: Petrus Christiaan Martinus Lenkens, Holly, MI (US); Jean Marie Victoir Bertholee, Ortonville, MI (US); Brian Thomas Fairchild, Clawson, MI (US); Robert Scott Grace, Whitemore Lake, MI (US)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 12/399,489

(22) Filed: Mar. 6, 2009

(65) Prior Publication Data
US 2010/0225147 A1    Sep. 9, 2010

(51) Int. Cl.
*B60J 7/00*    (2006.01)
(52) U.S. Cl. .................................. 296/214; 160/205
(58) Field of Classification Search ............... 296/214, 296/219, 100.03; 160/273.1, 205, 201, 200
See application file for complete search history.

(56) References Cited

U.S. PATENT DOCUMENTS

| | | | | |
|---|---|---|---|---|
| 1,509,450 A | * | 9/1924 | Sweeney | ............... 160/273.1 |
| 1,878,943 A | * | 9/1932 | Locke et al. | ................ 296/98 |
| 7,416,245 B2 | * | 8/2008 | Uehara et al. | ............... 296/214 |
| 7,665,506 B2 | * | 2/2010 | Coenraets | ................... 160/266 |
| 2004/0130189 A1 | | 7/2004 | Boehm | |

FOREIGN PATENT DOCUMENTS

| | | |
|---|---|---|
| DE | 4438104 C1 | 12/1995 |
| DE | 202004007359 U1 | 8/2004 |
| DE | 10320538 | 12/2004 |

OTHER PUBLICATIONS

Extended European Search Report from European Application 101155152.1 issued Jun. 24, 2010.

\* cited by examiner

*Primary Examiner*—Dennis H Pedder
(74) *Attorney, Agent, or Firm*—Steven M. Koehler; Westman, Champlin & Kelly, P.A.

(57) ABSTRACT

The roof assembly includes guide rails extending parallel and at a distance from each other. The guide rails each include a guide groove being defined between an upper and lower flange of the guide rails. The guide grooves open in a direction towards each other, and further comprise at least one closure panel, in particular a sunshade panel, having two opposite sides substantially parallel to the guide rails and each including at least two laterally projecting tabs for engagement into the respective guide groove. At least one of said lower and upper flanges of each guide rail has at least one cut-out for allowing the tabs of the closure panel to enter the guide groove.

15 Claims, 11 Drawing Sheets

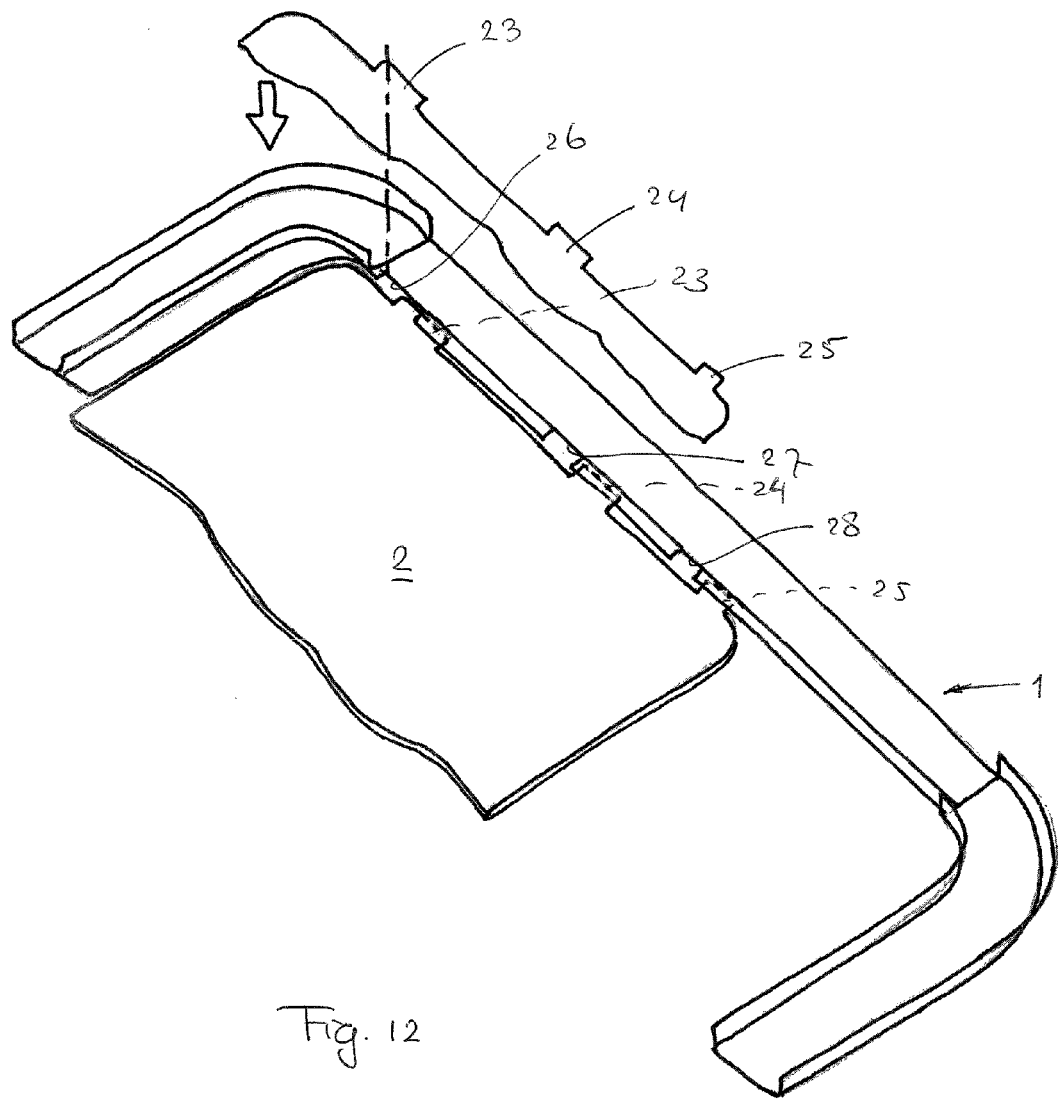
Fig. 12
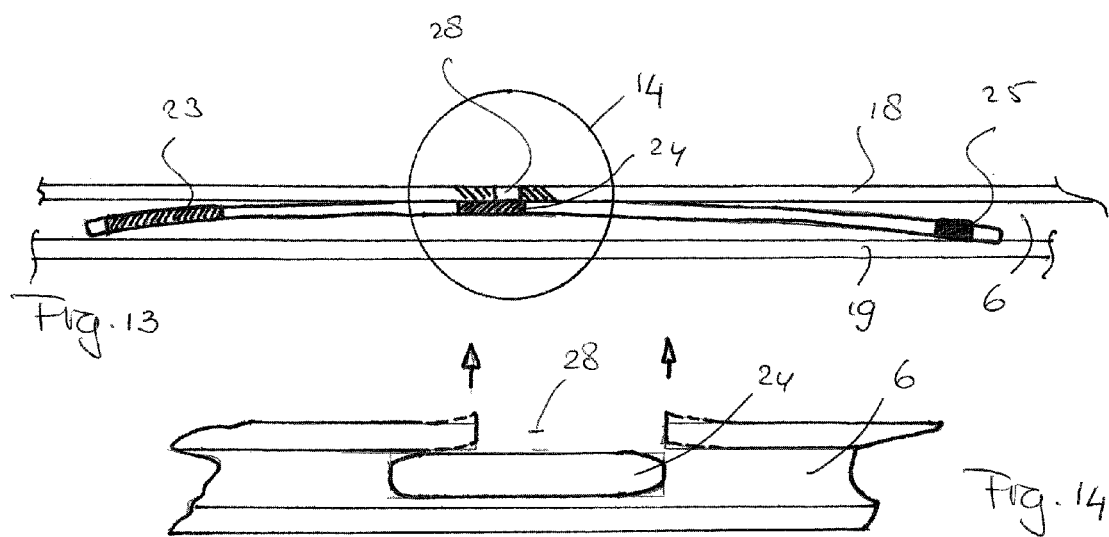
Fig. 13
Fig. 14

ROOF ASSEMBLY FOR A VEHICLE

BACKGROUND

The discussion below is merely provided for general background information and is not intended to be used as an aid in determining the scope of the claimed subject matter.

The invention relates to a roof assembly for a vehicle. The roof assembly comprises guide rails extending parallel and at a distance from each other, said guide rails including a guide groove being defined between an upper and lower flange of the guide rails and the guide grooves opening in a direction towards each other, and further comprising at least one closure panel, in particular a sunshade panel, having two opposite sides substantially parallel to the guide rails and each including at least two laterally projecting tabs for engagement into the respective guide groove.

Such roof assemblies are known in various embodiments. The tabs of the sunshade panels may be provided on mounting brackets which are attached to an insert in the sunshade by means of screws. If the tabs are not movably connected to the sunshade, the sunshade should be flexed and twisted to get the tabs into the respective guide groove of the guide rails. This can cause the sunshade to break and/or be damaged during installation. Sunshade panels comprising movably connected tabs or slide shoes are relatively complicated and therefore expensive.

SUMMARY

This Summary and Abstract are provided to introduce some concepts in a simplified form that are further described below in the Detailed Description. This Summary and Abstract are not intended to identify key features or essential features of the claimed subject matter, nor are they intended to be used as an aid in determining the scope of the claimed subject matter. In addition, the description herein provided and the claimed subject matter should not be interpreted as being directed to addressing any of the short-comings discussed in the Background.

An aspect of the invention comprises a roof assembly for a vehicle. The roof assembly includes guide rails extending parallel and at a distance from each other. The guide rails each include a guide groove being defined between an upper and lower flange of the guide rails. The guide grooves open in a direction towards each other, and further comprise at least one closure panel, in particular a sunshade panel, having two opposite sides substantially parallel to the guide rails and each including at least two laterally projecting tabs for engagement into the respective guide groove. At least one of said lower and upper flanges of each guide rail has at least one cut-out for allowing the tabs of the closure panel to enter the guide groove.

Due to the cut-out or cut-outs in the flange of the guide grooves, it is possible to insert the tabs of the closure panel from above or below, without having to flex or twist the closure panel. The tabs may therefore be formed integrally from a single unitary with at least a portion of the closure panel, thereby reducing production and installation costs.

Although it might be conceivable to have only one cut-out on each side of the closure panel, it is preferred that each tab of the closure panel is provided with its own cut-out and that the cut-outs are positioned such that all tabs can be aligned with their corresponding cut-outs simultaneously. This makes the mounting of the closure panel very easy.

It is favorable if the closure panel is provided with at least one slider in each guide groove of the guide rails, the sliders being adapted to receive the respective tabs of the closure panel.

In this embodiment the tabs are only used to mount the closure panel to the sliders that perform a sliding function. This embodiment may be especially used in roof assemblies wherein the closure panel, in particular a sunshade panel, is motor driven, the slider being adapted to allow a driving member, such as a cable, to engage the closure panel. The sliders can be optimized for their sliding function.

Conveniently, each slider comprises a cavity for each tab on the respective side of the closure panel. The cavities are positioned such that all cavities can be aligned with their corresponding cut-out in the guide rails simultaneously. As a result, the tabs can be inserted through the cut-outs directly into the cavities of the sliders in both guide grooves.

The guide rails may be provided with a device preventing the tabs from leaving the guide grooves through the cut-outs during the operation of the panel and in the embodiment using sliders, the cavities in the sliders are provided with a side cavity portion to which the respective tabs can be moved after insertion into the cavities. The side cavity portions can be covered at least partially by a cover portion towards the flange having the cut-outs in it. The cover portion forms the device preventing the tabs to leave the guide groove. Additional measures can be taken to keep the tabs in their side cavity portion, for example in case of a crash, e.g. by providing a threshold at the entrance of the side cavity portion or by providing a locking member in the cavity next to the side cavity portion, in particular a removable locking member.

A particular embodiment of the roof assembly comprises two closure panels, each having at least two tabs on each of the opposite sides, wherein the tabs of one closure panel can be spaced at a greater distance than the tabs of the other panel, and wherein the flange of the guide rails comprises three cut-outs, of which one is common to tabs of both closure panels and the other two are at a spacing from the one cut-out corresponding to the spacing between the tabs on both closure panels.

In another embodiment of the roof assembly, which is especially suitable for manually operated closure panels, the tabs may be positioned directly (with or without a plastic cover) in the guide grooves and will then act as sliding shoe sliding along the upper and/or lower flanges.

BRIEF DESCRIPTION OF THE DRAWINGS

Further details and advantages of the roof assembly according to aspects of the invention will appear from the following description with reference to the drawings showing embodiments of the roof assembly.

FIG. 12 is a very schematic perspective view of an alternative embodiment of the sunshade panel and the guide rail for a roof assembly.

FIG. 13 is an enlarged longitudinal sectional view of the guide rail and the panel of FIG. 12 in a different operational position.

FIG. 14 shows detail 14 of FIG. 13 on a larger scale.

DETAILED DESCRIPTION OF THE ILLUSTRATIVE EMBODIMENTS

Figure 1:
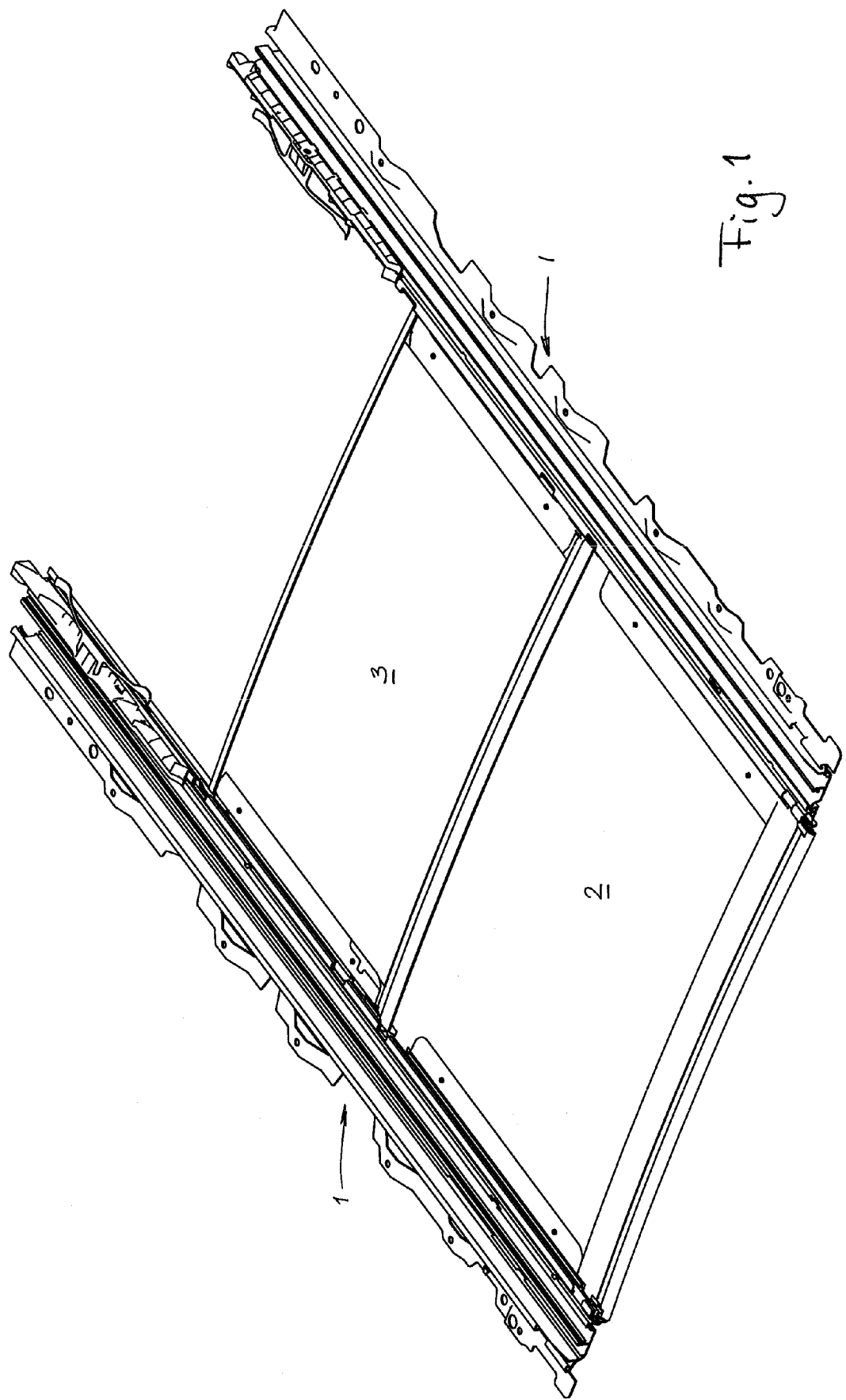
FIG. 1 is a perspective view of those parts of the roof assembly that are relevant for the present invention, that is the guide rails and the sunshade panels.
Figure 2:
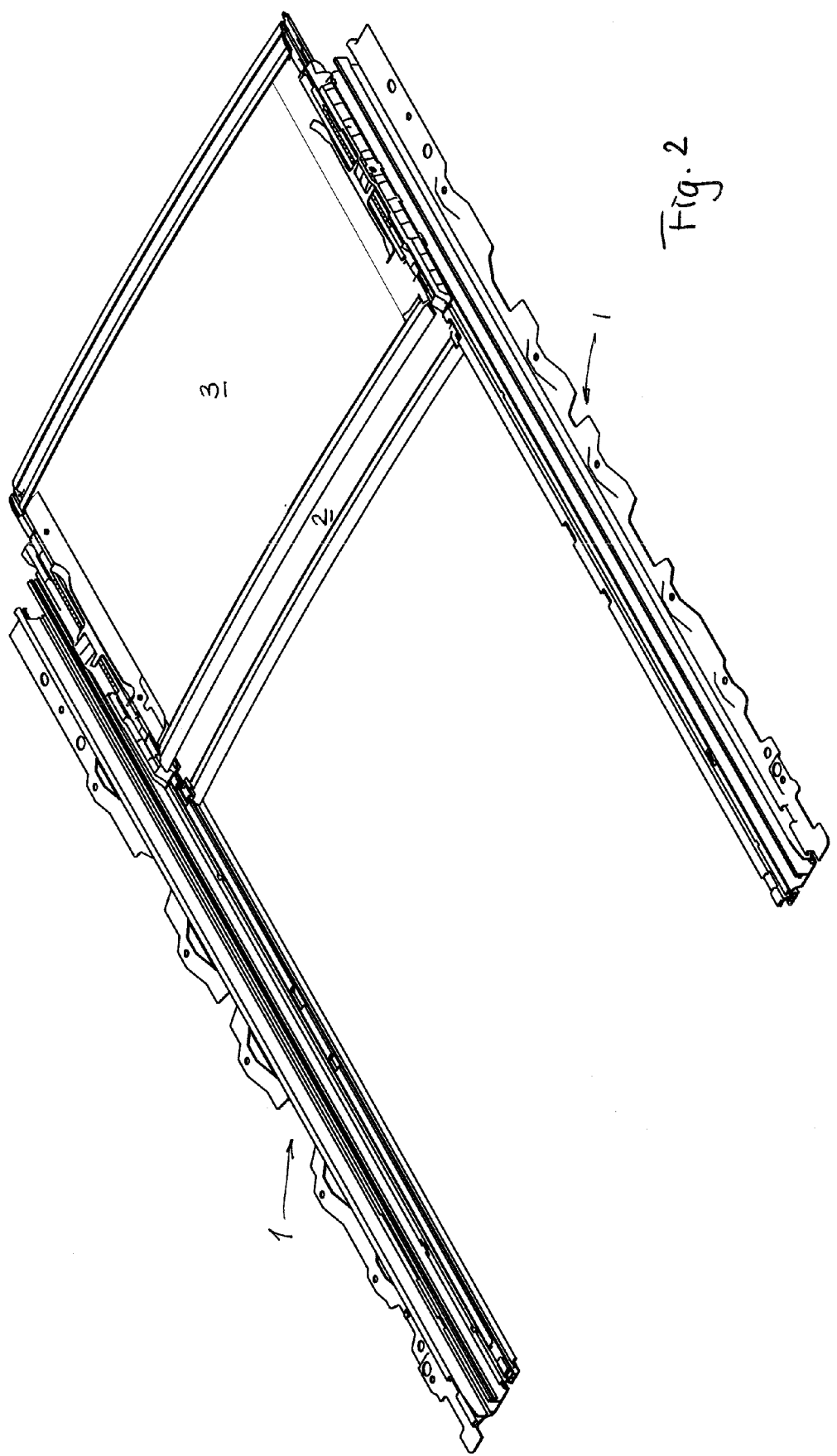
FIG. 2 is a view corresponding to that of FIG. 1, but showing the sunshade panels in the stacked open position instead of in the closed position according to FIG. 1.
Figure 3:
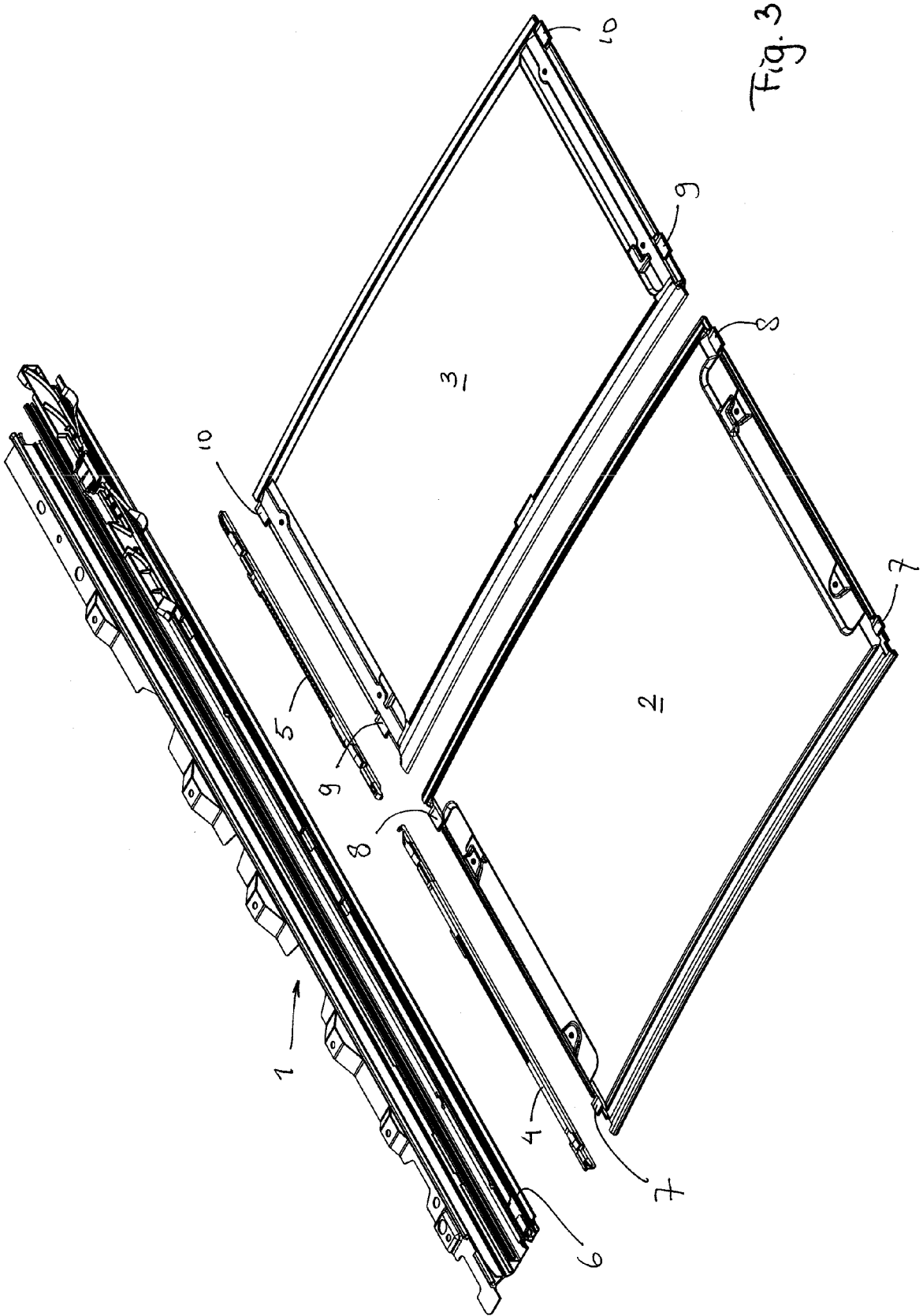
FIG. 3 is an exploded view of the sunshade panels and one of the guide rails.
Figure 4:
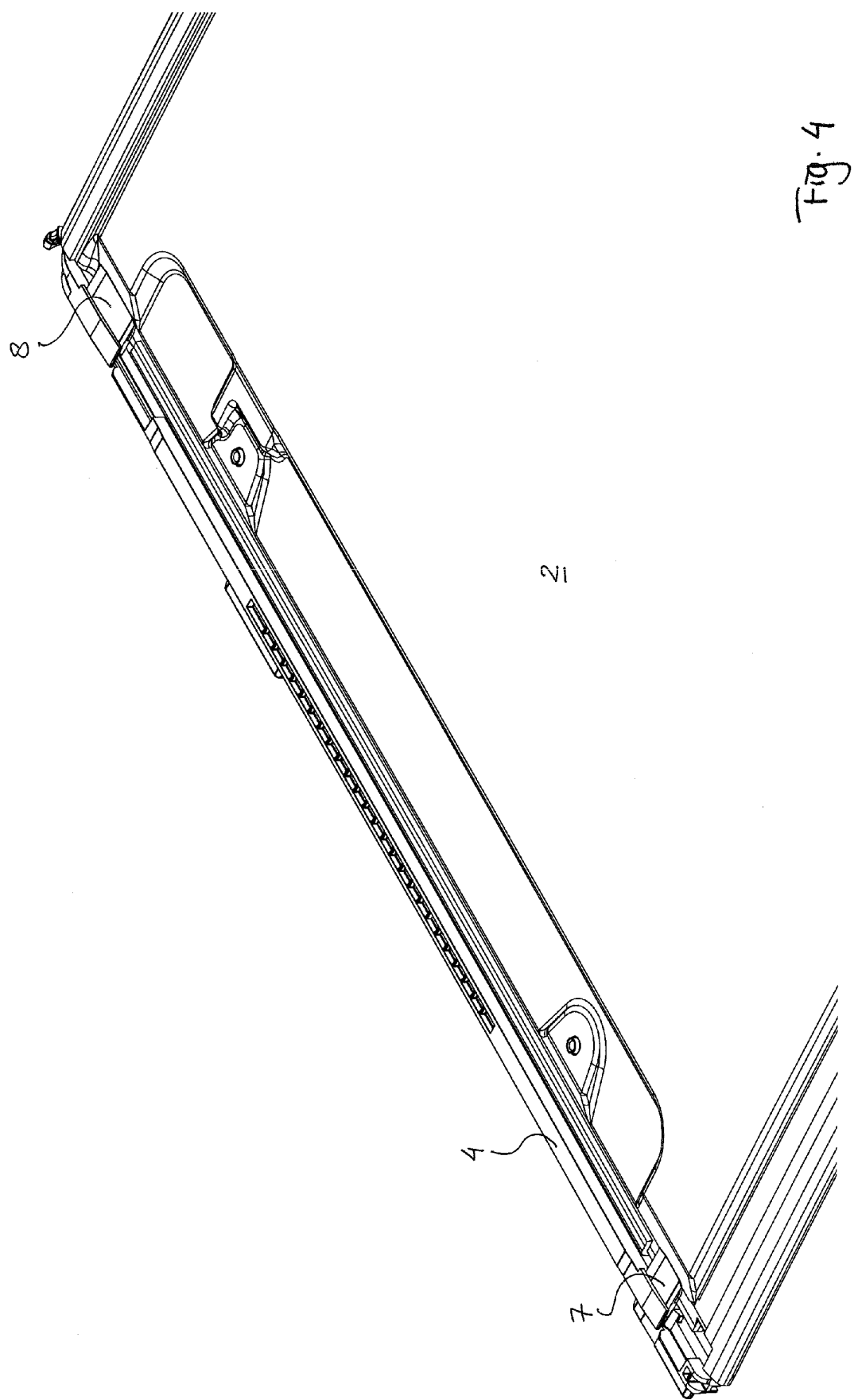
FIG. 4 is an enlarged perspective view of one side edge of the front sunshade panel and slider of FIG. 3.
Figure 5:
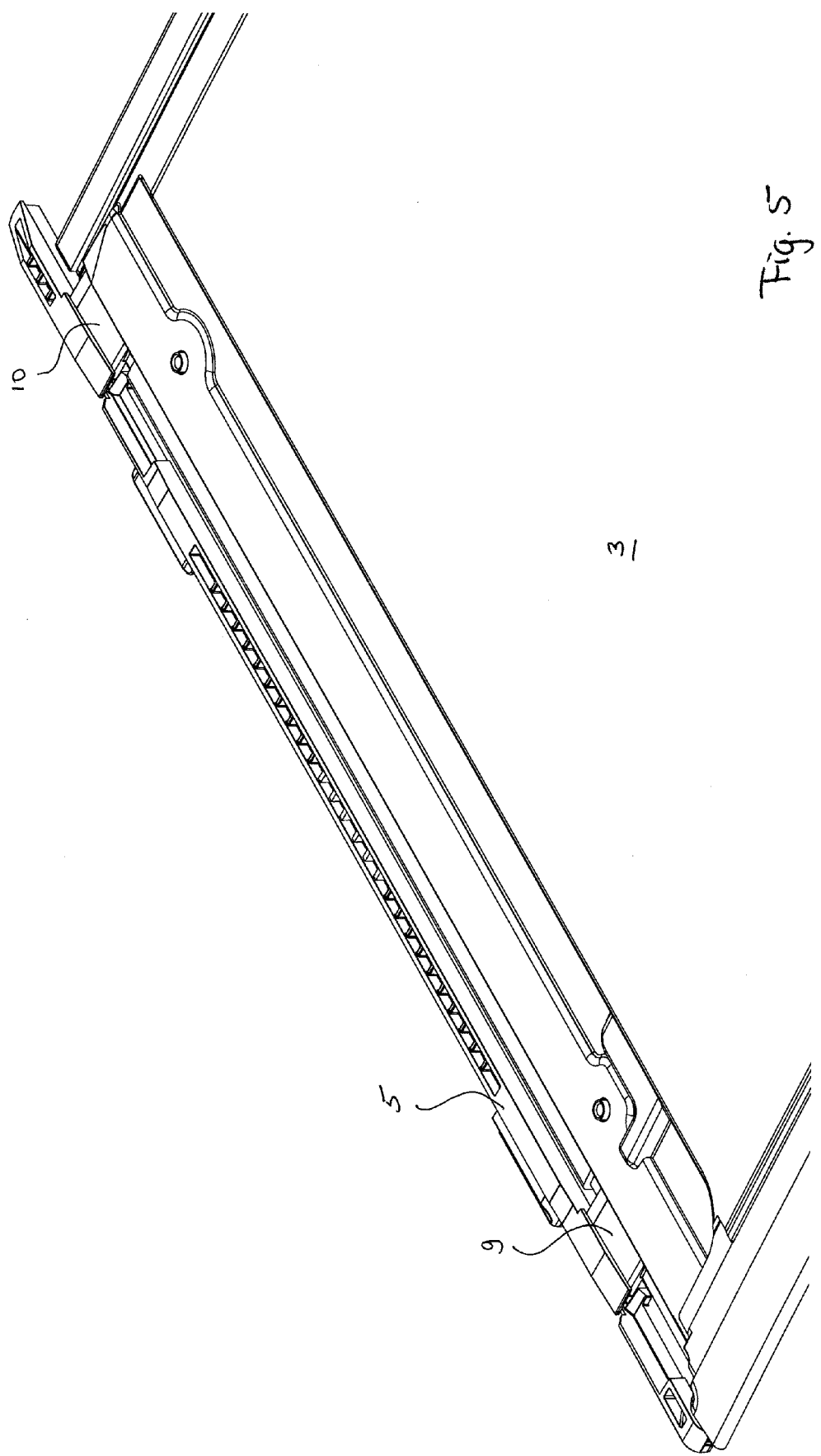
FIG. 5 is a view corresponding to that of FIG. 4, but showing the side edge of the rear panel and slider.

The drawings, and in first instance FIGS. 1-3 show the relevant parts of a roof assembly for a vehicle having a substantially rectangular opening in its fixed roof (not shown). The roof assembly is arranged in or below the roof opening and forms part of the fixed roof or is attached thereto. The roof assembly comprises a closure assembly, such as on or more transparent rigid panels, in order to selectively open and close the roof opening. This is all well known and is not shown in the drawings.

Relevant for the present invention are guide rails 1 positioned parallel to each other and at a distance from each other in order to slidably support further at least one closure panel, here in the form of a front sunshade panel 2 and a rear sunshade panel 3. FIG. 1 shows the sunshade panels 2, 3 in their closed position in which they will be substantially below the roof opening and within a passage opening formed between the guide rails 1, in order to prevent the sunrays from entering the interior of the vehicle in case the closure assembly lying above is either opened or transparent.

FIG. 2 shows the sunshade panels 2, 3 in the stacked open position in which the rear panel 3 has been moved rearwardly and upwardly so that the front sunshade panel 2 has been able to slide below the rear sunshade panel 3. This is known in the art.

In order to allow the sunshade panels 2, 3 to make sliding movements guided by the guide rails 1, the front and rear sunshades 2, 3 are provided on those opposite sides that are parallel to the guide rails 1 with front and rear sliders 4, 5 which fit into a common guide groove 6 in the guide rails 1.

Figure 6:
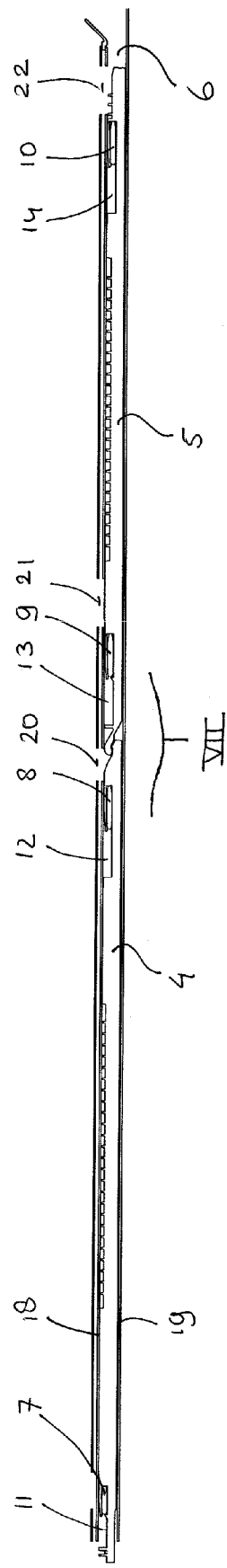
FIG. 6 is a schematic side view of one of the guide rails with the sliders of the sunshade panels mounted therein.
Figure 7:
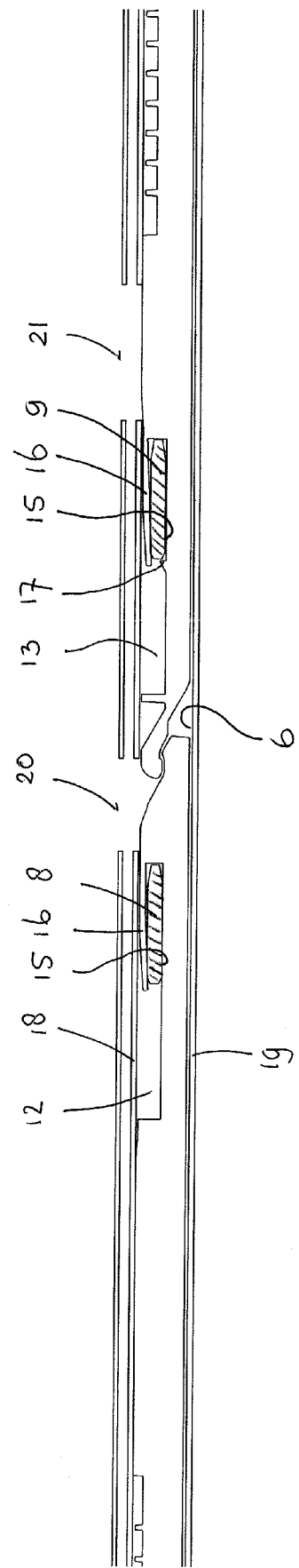
FIG. 7 is an enlarged view of detail VII in FIG. 6.

As is clear from the drawings, in particular FIGS. 3 and 6, the front and rear sliders 4, 5 are of different lengths, comparable to the lengths of the respective sunshade panels 2, 3. The sunshade panels 2, 3 can be connected to the respective sliders 4, 5 by means of tabs 7, 8 and 9, 10 which fit into cavities 11, 12 and 13, 14 in the front and rear sliders 4, 5. Referring to FIG. 7, each cavity 11-14 comprises a side cavity portion 15 to which the respective tabs 7-10 can be moved after insertion into the cavities 11-14. The side cavity portions 15 are covered by an upper cover portion 16. The side cavity portion 15 slightly converges in a direction towards the end of the upper cover portion 16, so as to exert a biasing force on the respective tab 7-10. The tabs 7-10 are tapered on one side to facilitate entry into the side cavity portion 15 below the upper cover portion 16. The bottom of at least one side cavity portion 15 (here in the rear cavities 12, 14) of each sunshade panel 2, 3 is provided with a threshold 17 acting as a member retaining the respective tab 7-10 within the side cavity portion 15.

In order to mount the sunshade panels 2, 3 to the guide rails 1, such that the tabs 7-10 are within the side cavity portions 15 and the sliders 11-14 are within the guide groove 6 of both guide rails 1, one of the substantially horizontal flanges 18, 19 defining the groove 6 is provided with one or more, in this case three cut-outs 20-22. The rear cut-out 22 and the central cut-out 21 have a center distance corresponding to the center distance between the front and rear tab 9, 10 of the rear sunshade panel 3, whereas the center distance between the rear cut-out 22 and the front cut-out 20 correspond to the center distance between the front and rear tab 7, 8 of the front sunshade panel 2. The front cut-out 20 and the front tab 7 of the front sunshade panel 2 are smaller than the other tabs 8-10 and cut-outs 21, 22 which is clearly shown in FIG. 6.

Figure 8:
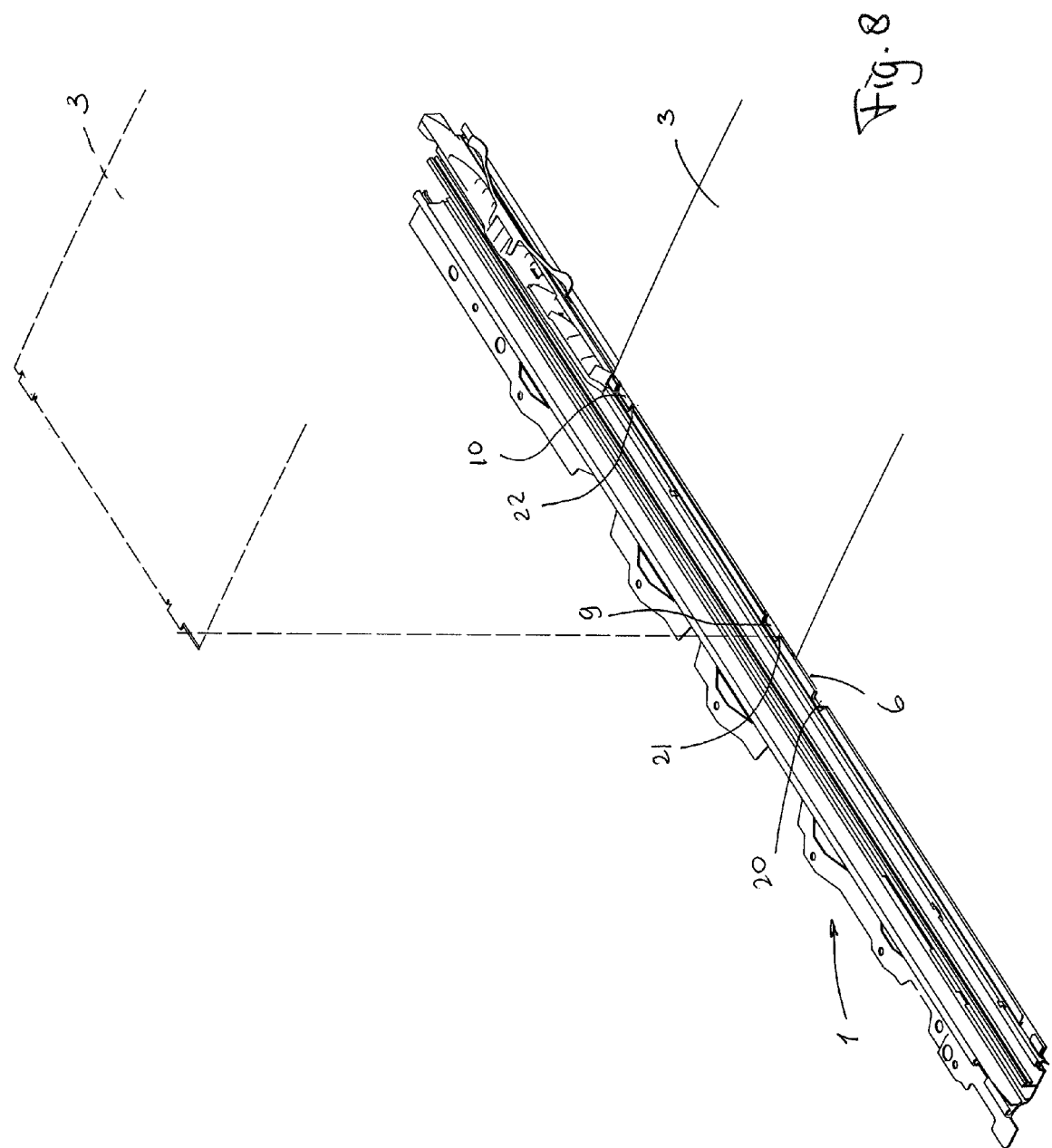
FIG. 8 is a perspective view of one of the guide rails and the rear sunshade panel to illustrate the mounting operation thereof.
Figure 9:
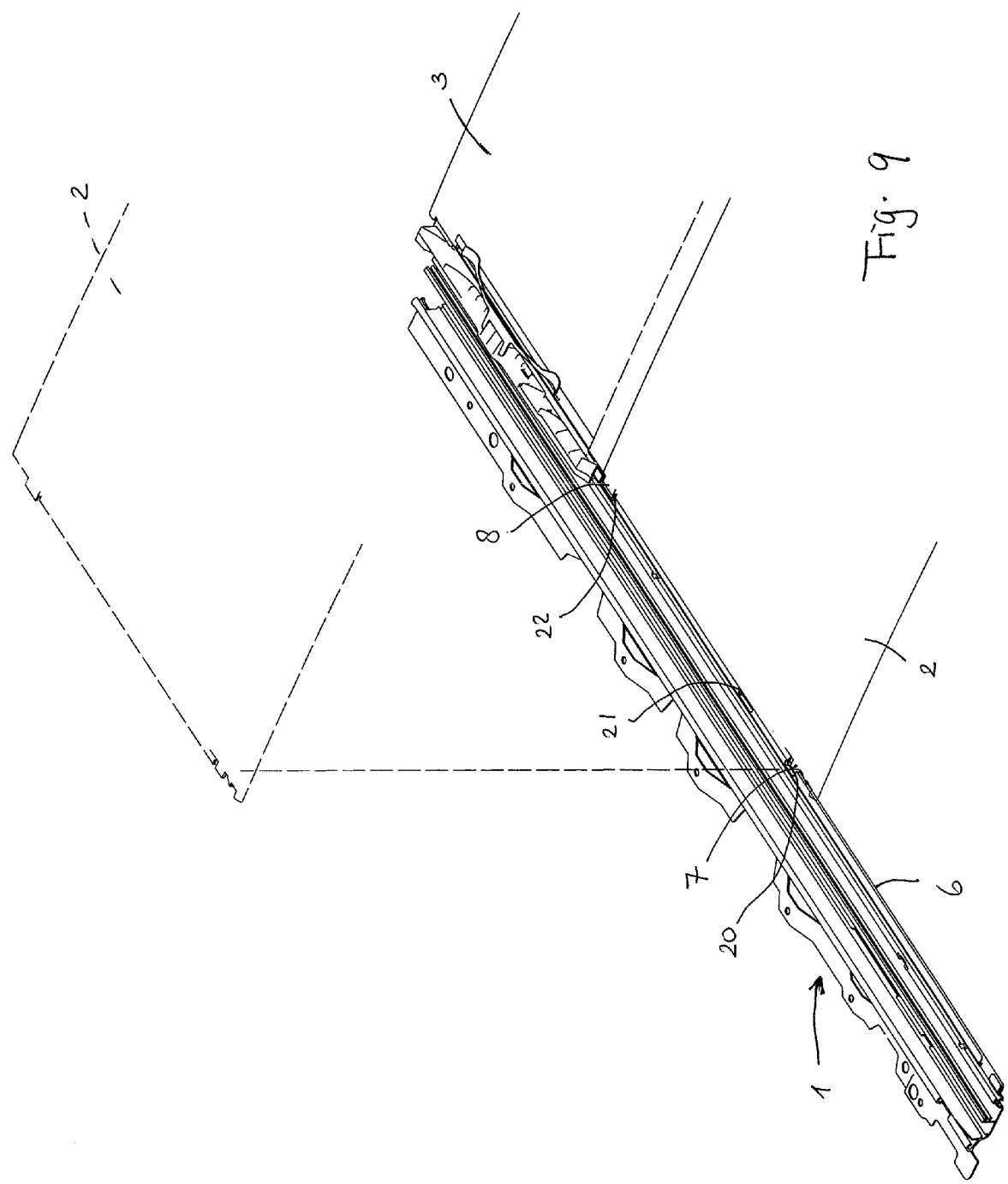
FIG. 9 is a view corresponding to that of FIG. 8, but illustrating the mounting of the front sunshade panel.

FIGS. 8 and 9 illustrate the manner of mounting the sunshade panels 2, 3. In FIG. 8 it is shown that the tabs 9, 10 of the rear sunshade panel 3 are brought in line with the cut-outs 21, 22 in the flange 18 of the guide groove 6. The rear slider 5 has already been inserted into the guide groove 6 in transverse direction such that the cavities 13, 14 are in line with the cut-outs 21, 22 as well. The rear sunshade panel 3 is then lowered from the position illustrated with dashed lines to the position illustrated with continuous lines, during which the tabs 9, 10 on both opposite sides of the rear sunshade panel 3 have been moved through the cut-outs 21, 22 into the cavities 13, 14. The rear sunshade panel 3 is then moved parallel to the guide groove 6 with respect to the rear slider 5 in rearward direction so that the tabs 9, 10 are pushed into the side cavity portion 16 up to a position beyond the threshold 17 so that, during normal operation, the rear sunshade panel 3 and the rear slider 5 are maintained in a fixed relative position. The upper cover portion 16 is urged downwardly onto the respective tab 9, 10 of the rear sunshade panel 3 so as to prevent rattling of the tabs within the cavities. The upper cover portion 16 is also slightly tapered on the upper side towards its free end in order to prevent the upper cover portion 16 from hooking behind an edge of the cut-outs 20-22.

After the rear sunshade panel 3 has been mounted into the guide rails 1, it is slid backwardly towards the stacking position so as to make room for the front sunshade panel 2.

In FIG. 9 it is shown that now the front sunshade panel 2 is aligned with its tabs 7, 8 above the front cut-out 20 and the rear cut-out 22, respectively and the sunshade panel 2 is then moved from its position as shown in dashed lines to the position shown in continuous lines in which the tabs 7, 8 have been moved through the cut-outs 20, 22 into the cavities 11, 12 of the front slider 4. After the tabs 7, 8 have reached their final position within the side cavity portion 15, the front and rear sunshade panels 2, 3 may then be brought into engagement with each other and be moved to one of their operational positions.

The reverse procedure may be used to demount the sunshade panels 2, 3 again in order to be serviced or to be replaced.

Figure 10:
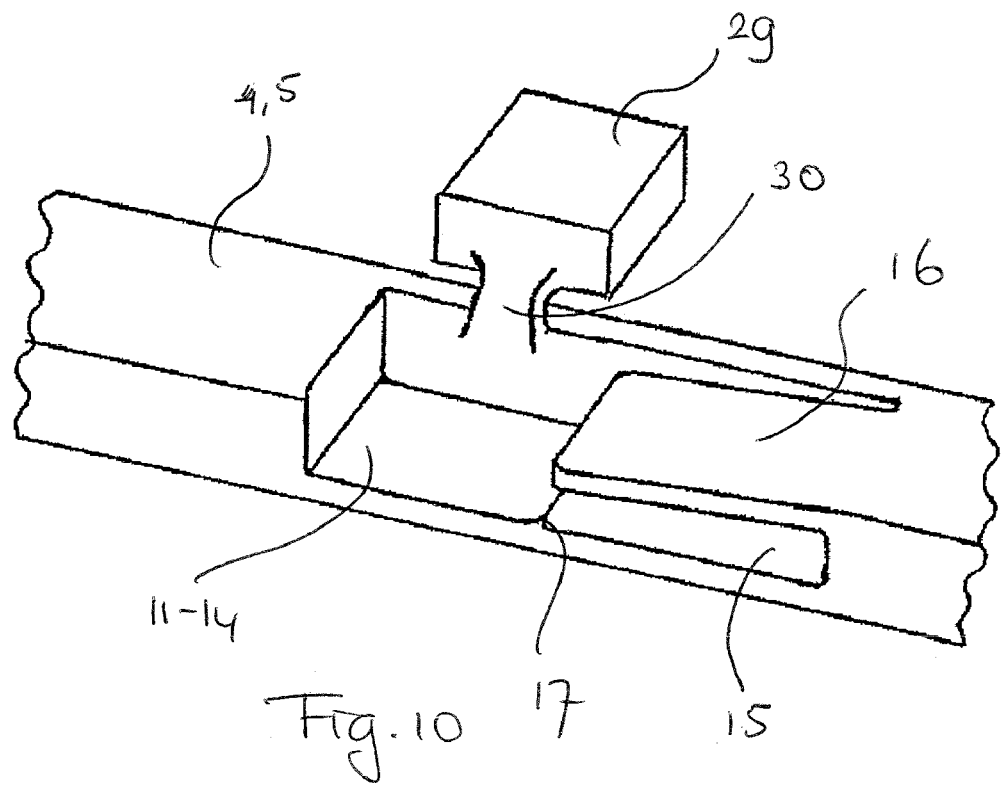
FIG. 10 is an enlarged schematic perspective view of a slightly amended slider of the roof assembly of FIGS. 1-9.
Figure 11:
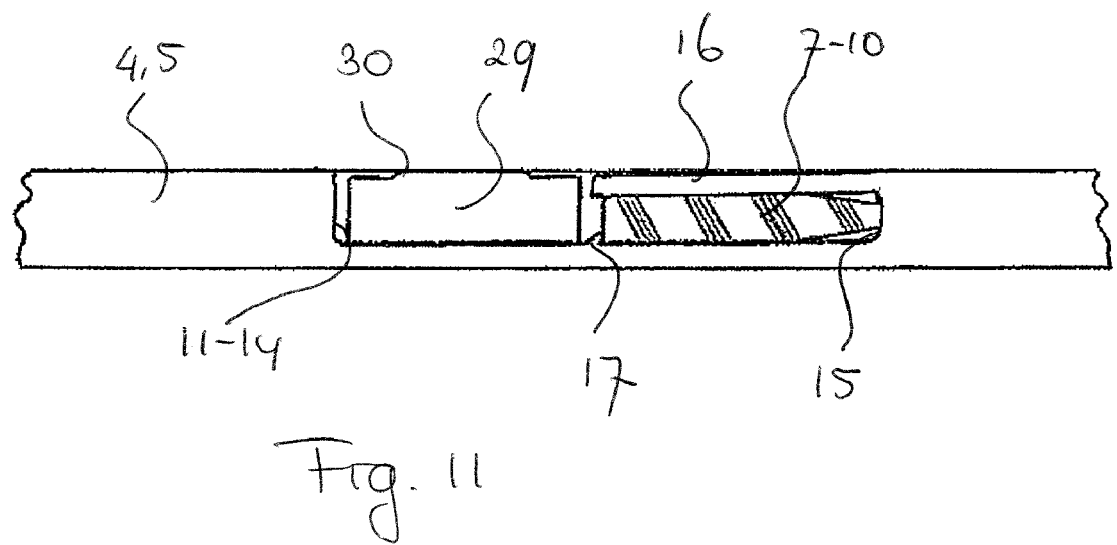
FIG. 11 is an enlarged longitudinal sectional view of a part of the guide rail, slider and tabs of the panel according to the embodiment of FIG. 10.

FIGS. 10 and 11 show a slightly different embodiment of the slider 4, 5 of FIGS. 1-10. It is shown that there is provided an additional locking member 29 in the form of a block of any material such as plastic rubber etc. The locking member 29 is pivotable by means of an integrated film hinge 30 between a position away from the cavity 11-14 allowing tab 7-10 to enter the cavity (FIG. 10) and a position within the cavity 11-14 next to the side cavity portion 15 thereby retaining the tab 7-10 within the side cavity portion 15. The locking member may be snapped in place, but other manners for holding the locking member in place are conceivable, e.g. bonding.

The film hinge may be left out. The locking member 29 may be provided in addition or in stead of the threshold 17.

FIG. 12-14 show a second embodiment of the roof assembly in which the sunshade panel 2 is provided with three tabs, 23-25, which directly engage into the guide groove 6 so as to function as a slide shoe which is in engagement with the upper and/or lower flange 18, 19 of the guide groove 6 as is shown in FIG. 11. The tabs 23-25 have different sizes, in this case different lengths in a direction parallel to the guide groove 6, such that the front tab 23 is the largest one and the rear tab 25 is the smallest one. The corresponding cut-outs 26-28 have fitting sizes. The tabs 23-25 are aligned with their respective cut-outs 26-28 only in a position outside their normal operating position, in this case in front of their front operational position shown in dashed lines. As a result of this, there is never a chance of a tab exiting the guide groove of the guide rail, because the tabs 23, 24 will only pass a smaller cut-out 27, 28, while the rear tab 25, which is the smallest, will never be aligned with a cut out in a normal operational position.

Generally, some stop or the like will be introduced into the guide groove 6 after the sunshade panel 2 has been moved to the operational position in order to prevent the sunshade panel to be moved back to its mounting position. This can only be done if the stop is demounted in order to remove the sunshade panel 2.

FIG. 13 illustrates that the sunshade panel 2 is slightly curved, such that the three tabs 23-25 are loaded within the guide groove 6 or held against portions of the groove 6 in order to prevent rattling.

FIG. 14 shows that the edges of the flange 18 defining the cut-outs 27, 28 are slightly bent away from the guide groove 6 (in this case upwardly) in order to allow the tabs 23, 245 to smoothly pass the cut-outs. At least the upper side of the tabs are also slightly tapered on their front end rear sides for the same purpose.

From the foregoing it is clear that aspects of the invention provide a roof assembly, especially a guiding system for the sunshade panel thereof which is very simple and low cost in structure and allows for a simple mounting operation without the risk of the sunshade being damaged.

Aspects of the invention are not limited to the embodiments shown in the drawings and described herein before, which can be varied in different manners within the scope of the appended claims. Features of the various embodiments may be used interchangeably while specific means may be replaced by alternative means. For example, it is possible to provide a slider or slide shoe for each tab of each closure panel. Furthermore, the cut-outs may be covered by a covering element, for example a sealing element which is provided for its sealing purpose anyhow. The sealing element may be attached to a further flange of the guide rails extending parallel to the flange containing the at least one cut-out and at a distance thereof away from the guide groove. The slider may be elastically bendable and may have a configuration deviating from that of the respective guide groove, the slider being adapted to be urged into the guide groove by elastic deformation so as to obtain a pretension on the slider. Deformation of the slider creates a spring force in the slider which urges at least portions of the slider against portions of the guide rail, when the slider is disposed in the guide rail.

Although the subject matter has been described in language specific to structural features and/or methodological acts, it is to be understood that the subject matter defined in the appended claims is not necessarily limited to the specific features or acts described above as has been determined by the courts. Rather, the specific features and acts described above are disclosed as example forms of implementing the claims.

What is claimed is:

1. A roof assembly for a vehicle, comprising guide rails extending parallel and at a distance from each other, said guide rails including a guide groove being defined between an upper and lower flange of the guide rails and the guide grooves opening in a direction towards each other, and further comprising at least one closure panel having two opposite sides substantially parallel to the guide rails and each side including at least two laterally projecting tabs for engagement into the respective guide groove, wherein at least one of said lower and upper flanges of each guide rail has at least one cut-out for allowing the at least two tabs of the closure panel to enter the respective guide groove, and wherein each tab of the closure panel is provided with its own cut-out, and the tabs and cut-outs are positioned such that all tabs can be aligned with their corresponding cut-outs simultaneously.

2. The roof assembly of claim 1, wherein the at least one cut-out is provided in the upper flange.

3. The roof assembly of claim 1, wherein the guide rails are provided with a device configured to prevent the tabs from leaving the guide groove through the cut-out during operation of the closure panel.

4. A roof assembly for a vehicle comprising guide rails extending parallel and at a distance from each other, said guide rails including a guide groove being defined between an upper and lower flange of the guide rails and the guide grooves opening in a direction towards each other, and further comprising at least one closure panel having two opposite sides substantially parallel to the guide rails and each side including at least two laterally projecting tabs for engagement into the respective guide groove, wherein at least one of said lower and upper flanges of each guide rail has at least one cut-out for allowing the tabs of the closure panel to enter the guide groove wherein the closure panel is provided with at least one slider in each guide groove of the guide rails, the sliders comprise receptacles to receive the respective tabs of the closure panel, wherein each receptacle includes a cavity for each tab, the cavities being positioned such that all cavities can be aligned with their corresponding cut-outs simultaneously, wherein the cavities in the sliders are provided with a side cavity portion to which the respective tabs can be moved after insertion into the cavities, the side cavity portions being covered at least partially by a cover portion towards the flange having the cut-outs in it, said cover portion preventing the tabs to leave the guide groove.

5. The roof assembly of claim 4, wherein each cavity comprises a retaining member retaining the respective tab therein.

6. The roof assembly of claim 5, wherein the retaining member includes a threshold at an entrance of the side cavity portion.

7. The roof assembly of claim 5, wherein the retaining member includes a locking member positioned in the cavity next to the side cavity portion.

8. A roof assembly for a vehicle, comprising guide rails extending parallel and at a distance from each other, said guide rails including a guide groove being defined between an upper and lower flange of the guide rails and the guide grooves opening in a direction towards each other, and further comprising at least one closure panel having two opposite sides substantially parallel to the guide rails and each side including at least two laterally projecting tabs for engagement into the respective guide groove, wherein at least one of said lower and upper flanges of each guide rail has at least one cut-out for allowing the at least two tabs of the closure panel to enter the respective guide groove, wherein the tabs are integrally formed from a single unitary body with at least a portion of the closure panel.

9. A roof assembly for a vehicle comprising guide rails extending parallel and at a distance from each other, said guide rails including a guide groove being defined between an upper and lower flange of the guide rails and the guide grooves opening in a direction towards each other, and further comprising two closure panels, each having at least two tabs on each of the opposite sides, wherein the tabs are positioned directly in the guide grooves and act as sliding shoes sliding along the upper and/or lower flanges, wherein the tabs of one closure panel are spaced at a greater distance than the tabs of the other panel, and wherein at least one of said lower and upper flanges of each guide rail comprises three cut-outs for allowing the tabs of the closure panels to enter the guide groove of which one cut-out is common to tabs of both closure panels and a second cut-out and a third cut-out are at a spacing from the one cut-out corresponding to the spacing between the tabs on both closure panels.

10. A roof assembly for a vehicle comprising guide rails extending parallel and at a distance from each other, said guide rails including a guide groove being defined between an upper and lower flange of the guide rails and the guide grooves opening in a direction towards each other, and further comprising at least one closure panel having two opposite sides substantially parallel to the guide rails and each side including at least two laterally projecting tabs for engagement into the respective guide groove wherein the tabs are positioned directly in the guide grooves and act as sliding shoes sliding along the upper and/or lower flanges, wherein at least one of said lower and upper flanges of each guide rail a plurality of cut-outs for allowing the tabs of the closure panel to enter the guide groove wherein the cut-outs in the flanges are provided in such position that the tabs of the closure panel are introduced in the guide grooves with the closure panel in a position outside its normal operating positions, and wherein the tabs and cut-outs in each guide groove are of different lengths such that within the normal operating positions the tabs will only align with cut-outs that are of shorter length.

11. The roof assembly of claim 9 and further comprising at least one slider in each guide groove of the guide rails, the sliders comprise receptacles to receive the respective tabs of the closure panel.

12. The roof assembly of claim 11 wherein each receptacle includes a cavity for each tab, the cavities being positioned such that all cavities can be aligned with their corresponding cut-outs simultaneously.

13. The roof assembly of claim 12, wherein each cavity comprises a retaining member retaining the respective tab therein.

14. The roof assembly of claim 13, wherein the retaining member includes a threshold at an entrance of the side cavity portion.

15. The roof assembly of claim 13, wherein the retaining member includes a locking member positioned in the cavity next to the side cavity portion.

* * * * *